United States Patent
Ronen et al.

(10) Patent No.: US 9,569,536 B2
(45) Date of Patent: Feb. 14, 2017

(54) IDENTIFYING SIMILAR APPLICATIONS

(71) Applicant: MICROSOFT CORPORATION, Redmond, WA (US)

(72) Inventors: Royi Ronen, Tel Aviv (IL); Gal Lavee, Tel Aviv (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 173 days.

(21) Appl. No.: 14/109,782

(22) Filed: Dec. 17, 2013

(65) Prior Publication Data

US 2015/0169759 A1    Jun. 18, 2015

(51) Int. Cl.
*G06F 17/30* (2006.01)

(52) U.S. Cl.
CPC ... *G06F 17/30864* (2013.01); *G06F 17/30572* (2013.01)

(58) Field of Classification Search
None
See application file for complete search history.

(56) References Cited

U.S. PATENT DOCUMENTS

| | | |
|---|---|---|
| 6,366,906 B1 | 4/2002 | Hoffman |
| 6,804,659 B1 | 10/2004 | Graham et al. |
| 7,260,568 B2 | 8/2007 | Zhang et al. |
| 7,466,859 B2 | 12/2008 | Chang et al. |
| 7,739,358 B2 | 6/2010 | Lee et al. |
| 7,890,526 B1 | 2/2011 | Brewer et al. |
| 8,392,282 B2 | 3/2013 | Hideo et al. |
| 8,484,636 B2 | 7/2013 | Mehta et al. |
| 8,515,979 B2 | 8/2013 | Mehta |
| 8,615,510 B2 | 12/2013 | Chi et al. |
| 2001/0042099 A1 | 11/2001 | Peng |
| 2001/0047363 A1 | 11/2001 | Peng |
| 2002/0143991 A1 | 10/2002 | Chow et al. |
| 2003/0105682 A1 | 6/2003 | Dicker et al. |
| 2003/0149688 A1 | 8/2003 | Maeno |

(Continued)

FOREIGN PATENT DOCUMENTS

| | | |
|---|---|---|
| CN | 1754165 A | 3/2006 |
| CN | 101136938 A | 3/2008 |

(Continued)

OTHER PUBLICATIONS

Sahebi et al., "An Enhanced Similarity Measure for Utilizing Site Structure in Web Personalization Systems", in IEEE/WIC/ACM International Conference on Web Intelligence and Intelligent Agent Technology, vol. 3, Dec. 9, 2008, 4 pages.

(Continued)

*Primary Examiner* — Hung Q Pham
(74) *Attorney, Agent, or Firm* — Steven Spellman; Tom Wong; Micky Minhas

(57) ABSTRACT

Systems, methods, and media for proposing similar applications to a candidate application are provided. A similar results server may surface similar applications to a user of an application store. The applications can be selected based on similarity between features of the application. The features may be extracted from graphical user interface information rendered by a device that executes the applications. The applications that are identified as similar (e.g., based on the features) are displayed to the user.

20 Claims, 5 Drawing Sheets

(56) References Cited

U.S. PATENT DOCUMENTS

| | | |
|---|---|---|
| 2004/0181525 A1 | 9/2004 | Itzhak et al. |
| 2005/0004889 A1 | 1/2005 | Bailey et al. |
| 2005/0267872 A1 | 12/2005 | Galai et al. |
| 2006/0155728 A1 | 7/2006 | Bosarge |
| 2007/0288514 A1 | 12/2007 | Reitter et al. |
| 2007/0288648 A1 | 12/2007 | Mehanna et al. |
| 2008/0147856 A1 | 6/2008 | Lee et al. |
| 2008/0235187 A1 | 9/2008 | Gade et al. |
| 2008/0270228 A1 | 10/2008 | Dasdan |
| 2008/0281816 A1 | 11/2008 | Kim |
| 2009/0006330 A1 | 1/2009 | Pandey et al. |
| 2009/0132529 A1 | 5/2009 | Gibbs |
| 2009/0300656 A1 | 12/2009 | Bosworth et al. |
| 2010/0106703 A1 | 4/2010 | Cramer |
| 2010/0191856 A1 | 7/2010 | Gupta et al. |
| 2011/0072001 A1 | 3/2011 | Basu et al. |
| 2012/0096435 A1 | 4/2012 | Manolescu et al. |
| 2012/0210213 A1 | 8/2012 | Watanabe et al. |
| 2012/0290583 A1 | 11/2012 | Mahaniok et al. |
| 2013/0132896 A1 | 5/2013 | Lee et al. |
| 2013/0198029 A1 | 8/2013 | Mowatt et al. |
| 2013/0290322 A1* | 10/2013 | Prosnitz et al. .. G06F 17/30554 707/723 |
| 2013/0290344 A1* | 10/2013 | Glover et al. ...... G06F 17/3053 707/741 |

FOREIGN PATENT DOCUMENTS

| | | |
|---|---|---|
| CN | 102360364 A | 2/2012 |
| EP | 1540514 | 12/2010 |
| EP | 1540514 B1 | 12/2010 |
| JP | 11194865 A | 7/1999 |
| JP | 2010129073 A | 6/2010 |
| JP | 2011076566 A | 4/2011 |
| WO | 2011036755 A1 | 3/2011 |

OTHER PUBLICATIONS

PCT Search Report dated Mar. 18, 2013 re PCT/US2012/042786.

"AppHome—Application Launcher for Chrome ", Retrieved on: Apr. 4, 2011.

"Chrome App Launcher Shortcut button to launch Chrome apps", Retrieved on: Apr. 4, 2011.

"3Firefox Addons That Let You Search Faster Than Google Instant", Retrieved on: Apr. 4, 2011.

Martin Brinkmann, "Mozilla Demos Web Apps Store", Retrieved on: Apr. 4, 2011.

"AppJump App Launcher and Organizer", Retrieved on: Apr. 5, 2011.

"Omni Launch: Launch Installed Web apps from the URL bar", Retrieved on: Apr. 5, 2011.

International Search Report with Written Opinion dated Mar. 4, 2013 in Application No. PCT/US2012/042789, 11 pages.

Search Report Issued in European Patent Application No. 12800304.3, Mailed Date: Jan. 27, 2015, 9 Pages.

Search Report Issued in European Patent Application No. 12800304.3, Mailed Date: Jan. 28, 2015, 10 Pages.

Non-Final Office Action dated Feb. 26, 2014 in U.S. Appl. No. 13/161,792, 27 pages.

Final Office Action dated Aug. 6, 2014 in U.S. Appl. No. 13/161,792, 31 pages.

Non-Final Office Action dated Feb. 9, 2015 in U.S. Appl. No. 13/161,792, 30 pages.

"First Office Action dated Jul. 15, 2015 with Search Report dated Jul. 1, 2015, issued in Chinese Patent Application No. 201280029479.0", 13 Pages.

Final Office Action dated May 27, 2015 in U.S. Appl. No. 13/161,792, 36 pages.

Non-Final Office Action dated Mar. 10, 2016 in U.S. Appl. No. 13/161,792, 39 pages.

* cited by examiner

IDENTIFYING SIMILAR APPLICATIONS

RELATED APPLICATION

This application is related by subject matter to U.S. application Ser. No. 13/161,792 entitled "Surfacing Applications Based on Browsing Activity" filed on Jun. 16, 2011.

BACKGROUND

Recent trends have shown that there are more applications, or apps, created to fulfill users' tasks. For example, various platforms (e.g., Apple®, Android®, and Microsoft®) have had exponential growth in their respective app stores and currently offer over 500,000 aggregate apps for their respective mobile devices. In spite of the growing use of applications, popular or relevant applications may be hard to discover. For example, The Windows® store and Xbox® stores support thousands of productivity and gaming applications.

Current technology directed at discovering similar applications include description-based filtering or co-purchase analysis. The description-based filtering has the promise of providing alternative apps that are similar. In this approach, the textual descriptions of the applications are compared for similarity. For instance, the number of matching words may be used as a similarity score among applications.

On the other hand, co-purchase analysis proposes apps that were purchased by other users along with the candidate or query apps. Application purchase data may be analyzed to compute a measure of similarity between applications. For instance, Jacard Similarity, a ratio of the number of users who purchased both items to the number of users who bought either of the items may be used to determine a similarity score from the co-purchase data. The co-purchase measure of similarity identifies applications that are complementary to one another (e.g., image capture application and image editing application).

These conventional approaches return reliable results for applications that have detailed descriptions or applications that have significant co-purchase information. Unfortunately, application descriptions may be misused or manipulated by developers to influence similarity proposals such that the developers' application is always included in a similar application result set. Co-purchase information is usually available only for the most popular items in an app store. Also, these two approaches tend to overlook applications that have sparse descriptions or little if any co-purchase information.

SUMMARY

Embodiments of the invention provide proposals having similar applications to a candidate application. A server device is configured to extract features for applications and to identify similar applications based on the extracted features. The server device is also programmed to identify features of the applications based on graphical user interfaces that are rendered by the application during execution of the application. Based on the graphical user interface features extracted from the application, a similarity score can be computed between any pair of apps in the catalog. In response to a request for apps similar to a query application or a recently installed application on a device the server can return a list of similar app results sorted by this similarity score.

In one embodiment, a computer system is configured to return a list of similar applications. The computing system may include an extraction engine and a similar results engine. The computing system may connect to a database that is configured to store applications. The extraction engine accesses the application and identifies features of the applications including features that appear within graphical user interfaces of the application during execution of the application. The similar results engine provides one or more similar applications to a query application identified by a user.

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE DRAWINGS

Embodiments of the invention are described in detail below with reference to the attached drawing figures, wherein.

DETAILED DESCRIPTION

Figure 1:
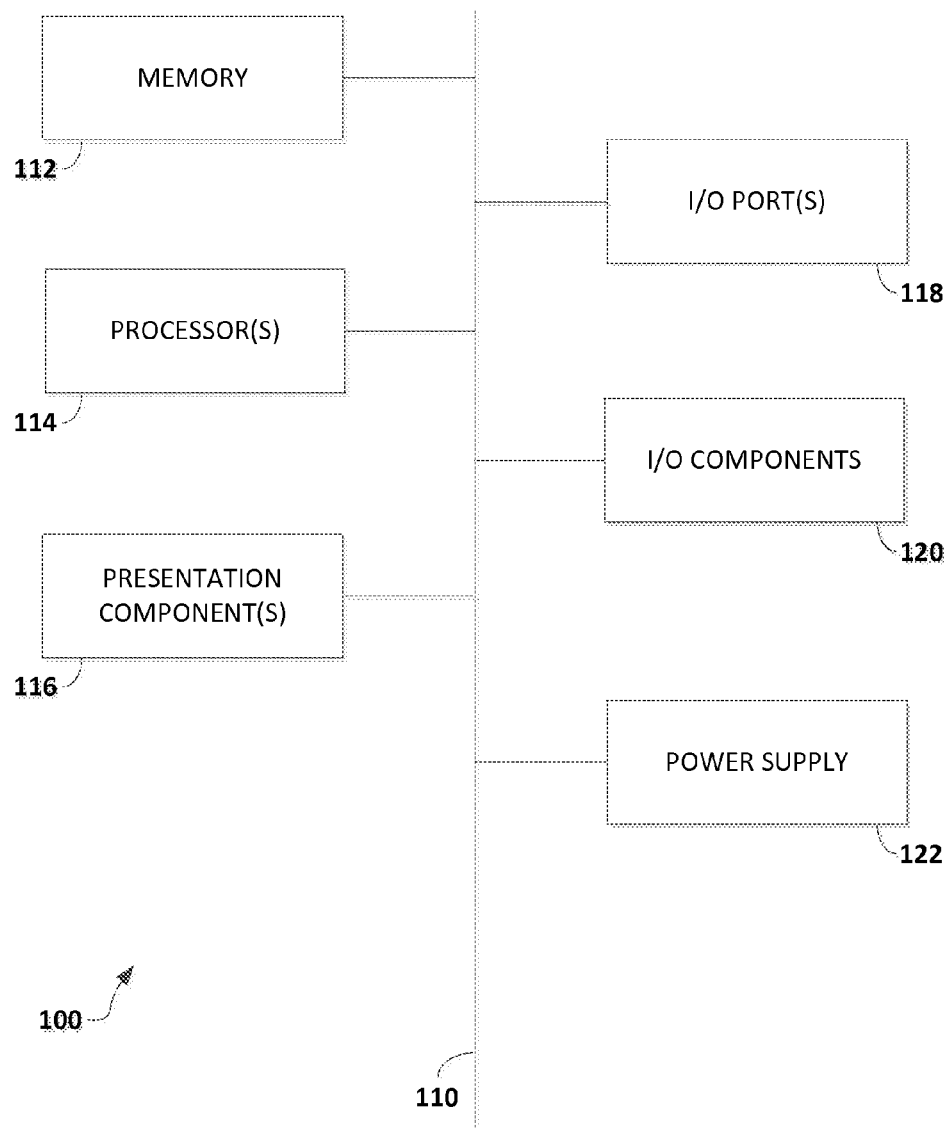
FIG. 1 is a block diagram of an exemplary computing device suitable for implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

Embodiments of the invention propose application based on similarity scores. A similar results server may be configured to assess similarity based on features associated with the application. The application may be executed in several operating environments (e.g., Workstation, Mobile, or Cloud) to determine similarity. For instance, the graphical user interfaces of the applications are assessed for similarity in the Windows® Desktop, Windows® Phone, or X-box® environments. The similar results server may extract binary or weighted features from the graphical user interface of the executed applications. In one embodiment, the server populates feature vectors and determines similarity between applications based on the vector similarity (e.g., cosine distance). In other embodiments, the server may provide the features to a machine learning algorithm (e.g., expectation-maximization (EM) algorithm) that predicts similarity.

Accordingly, the similar results server may be accessed by a user to determine application similarity. The similar results server may return applications similar to a target application to the user. The similar results may be personalized based on application requests or recent application installations. For instance, a user may request to view all applications that are similar to a browser application or an encyclopedia application. Additionally, the user, who has previously installed the "browser" application, may access the application store in "browse" mode. In turn, the similar results server may provide application candidates that are scored by their similarity to the applications the user has already installed (e.g., most recently installed).

In other embodiments, the similar results server may return similar applications based on application browser activity for other users who have installed identical applications. The browser activity, in at least one embodiment, of other users may be analyzed by the similar results server to determine similarity to the application results viewed proximate to installation of the identical applications by other users. Accordingly, the similar results server provides similarity based on installation or usage patterns observed at several other users of an application store. The usage patterns may be determined from applications that are cloud-based applications. These embodiments include systems and methods for surfacing applications (also referred to as "apps") based on browsing/installation activity of users of the application store.

In some embodiments, the similar applications may be surfaced without the user providing a query application. Instead, the applications can be surfaced to the user based on an application that was recently installed by the user. Additionally, similar applications may be surfaced based on a uniform resource locator (URL), a uniform resource indicator (URI), or another type of network address that is rendered in the graphical user interface generated upon execution of the installed application. The URL, uniform URI, or another type of network address may point to other applications that are related to the installed application (e.g., document editing applications, database applications, or document publishing applications). In some embodiments, the applications can be surfaced in a manner that provides additional context to a user, such as information about how an app was selected for presentation to the user. The context, in one embodiment, may include a screenshot of the graphical user interface that includes the uniform resource locator (URL), uniform resource indicator (URI), or another type of network address may point to other applications that are related to the installed application.

The feature vector generated by the similar results server includes textual description information and co-purchase information. In addition to the textual description information and co-purchase information, the feature vectors also include graphical user interface elements that are rendered by the device when executing the application. These additional features allow the similar results server to provide similar results that assess graphical user interface (GUI) elements and application processing in addition to textual description information and co-purchase information.

The textual description information and co-purchase information may be manipulated to have an application always show up in search results for applications. In some instances, the similar results based on textual descriptions alone are subject to manipulation. For instance, textual descriptions are sometimes sparse and uninformative. Furthermore, the descriptions are often stylized to entice the user to install an application. The description may also be formatted to be term-rich for search result manipulation. These descriptions may not necessarily reflect the true functionality of the application. Because the descriptions are susceptible to spamming and other manipulation, the feature vectors' assessment of similarity include graphical elements from the GUIs of the application.

Moreover, similar results based on co-purchase information alone are also disfavored. The co-purchase information is abundant for popular applications (head applications). On the other hand, the co-purchase information is sparse for the lesser-known applications (tail applications). The similar results based on co-purchase information alone are not reliable because the similar results regarding the similarity of two applications may be biased based on the popularity of the applications. Tail applications are rarely included in the similar results based on co-purchase information alone.

Accordingly, the feature vectors assess similarity based on, among other things, textual descriptions, graphical elements, and co-purchase information. The similar results server accesses GUIs of applications and extract features of the GUIs to determine similarity. For instance, text available in the markup language (e.g., HTML) of the application or text in the graphical elements of the GUIs is extracted to assess similarity. The similar results server assesses similarity based on, among other things, textual description information, co-purchase information, HTML similarity, and look and feel (graphical) similarity.

Embodiments of the invention introduce technology for recommending similar applications. The terms "applications" and "apps" are used interchangeably herein and broadly pertain to application software designed to be executed by an operating system hosted on a computing device and to assist the user in performing a singular or multiple related specific tasks. In operation, apps can provide digital solutions in the real world, such as word processing, gaming, communication-based interfaces, etc. Examples of apps can include enterprise software, accounting software, office suites, graphics software, video games, and media players. It should be understood and appreciated that the definition of apps is not limited to the scope of examples provided herein and may include any code that carries out one or more operations when executed.

Having described an overview of embodiments of the invention, an exemplary operating environment in which embodiments of the invention may be implemented is described below to provide a general context for various aspects of the embodiments of invention.

The following discussion describes various embodiments of the invention. Note that several of the exemplary embodiments described below are based on current applications to make the discussion more concrete. However, aspects of the embodiments of the invention should not be construed as being limited to a particular application or platform that offers the particular application. That is, embodiments of the invention may be designed to be applied to differing platforms (e.g., including PC, iPhone®, and Microsoft Windows®) and other various implementations of an application store. The application store may be cloud service available to client devices.

FIG. 1 is a block diagram illustrating an exemplary computing environment suitable for implementing embodiments of the invention. Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Nor should the computing device 100 be interpreted as having any dependency or requirement relating to any one or combination of components illustrated.

The embodiments of the invention may be described in the general context of computer code or machine-useable instructions, including computer-executable instructions such as program components being executed by a computer or other machine, such as a personal data assistant or other handheld device. Generally, program components including routines, programs, applications objects, components, data structures, and the like, refer to code that performs particular tasks or implements particular abstract data types. Embodiments of the invention may be practiced in a variety of system configurations, including handheld devices, tablet computers, consumer electronics, gaming consoles, general-purpose computers, specialty computing devices, etc. Embodiments of the invention may also be practiced in distributed computing environments where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the computer storage memories. The logic associated with the instructions may be implemented, in whole or in part, directly in hardware logic. For example, and without limitation, illustrative types of hardware logic include field programmable gate array (FPGA), application-specific integrated circuit (ASIC), system-on-a-chip (SOC), or complex programmable logic devices (CPLDs). The hardware logic allows a device to search for similar applications in accordance with embodiments of the invention. A server device may be configured to provide similar results based on feature vectors created for the applications. The client device may receive suggestions for similar application from the server device.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an input/output (I/O) component. Also, processors have memory. One of ordinary skill in the art recognizes that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refers to "computer" or "computing device."

Computing device 100 typically includes a variety of computer-readable media. Computer-readable media can be any available media that is accessible by computing device 100 and includes both volatile and nonvolatile media, and removable and nonremovable media. Computer-readable media may comprise computer storage media and communication media.

Computer storage media includes volatile and nonvolatile, removable and nonremovable media implemented in any method or technology for storage of information such as computer-readable instructions, data structures, program modules, or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other hardware medium that can be used to encode desired data and that can be accessed by the computing device 100. In an embodiment, the computer storage media can be selected from tangible computer storage media like flash memory. These memory technologies can store data momentarily, temporarily, or permanently. Computer storage media excludes communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller (such as a stylus, keyboard, and mouse) or a natural user interface (NUI), etc.

The NUI processes gestures (e.g., hand, face, and body), voice, or other physiological inputs generated by a user. These inputs may be interpreted as queries, requests for selecting URIs, or requests for interacting with a URI included as a search result, requests for launching an application, or requests of updates to the user interface. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Various aspects of the technology described herein are generally employed in computer systems, computer-implemented methods, and computer-readable storage media for, among other things, generating a user interface. As explained above, a server may generate user interfaces for applications, create feature vectors based on information extracted from the GUIs, and provide similar results having similar applications based on the distance between the feature vectors for the applications.

The embodiments of the invention provide a similar results server that assesses similarity among applications. The applications may be available from an application store. The application store provides the applications to the similar results server for processing. The server generates a feature vector for each application and determines similarity based on the distance between the feature vectors.

Figure 2:
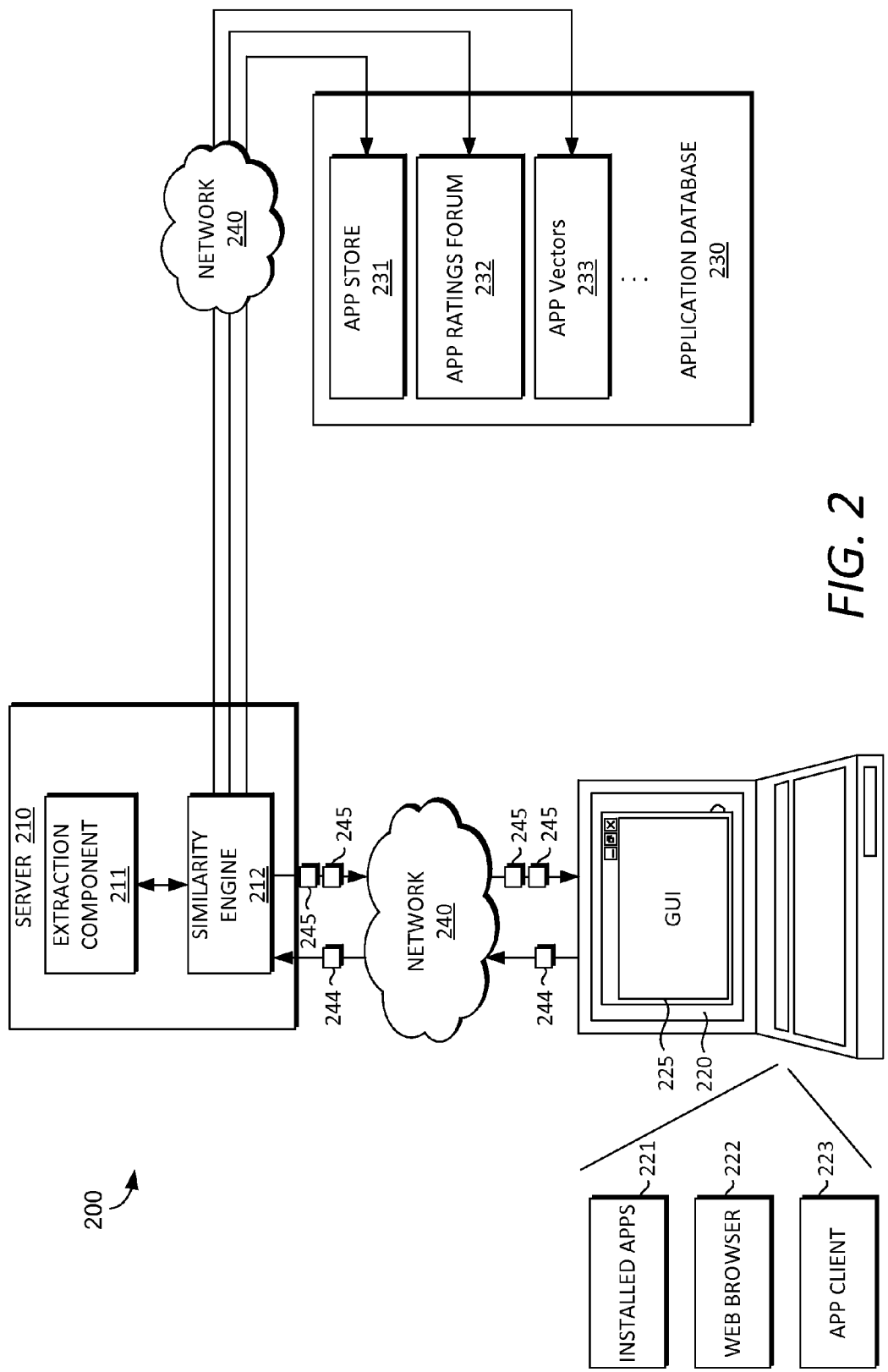
FIG. 2 is a block diagram of an exemplary system architecture of a distributed computing environment configured for use in implementing embodiments of the invention.

FIG. 2 is a block diagram of an exemplary system architecture of a distributed computing environment 200 configured for use in implementing embodiments of the invention. The computing environment 200 includes a similar results server 210, a client device 220, and an application database 230. The computing environment 200 is configured to communicate over a network 240. The network 240 communicatively connects the similar results server 210, the client device 220, and the application database 230 to each other.

The similar results server 210 provides suggestions for similar applications. The similar results server 210 may build feature vectors, normalize them, and execute machine learning algorithms (e.g., vector space model) to assess similarity between the feature vectors. The machine learning algorithms may predict similarity after being trained on a seed set of applications with similarity labels. After training the machine learning algorithm with similarity labels for a seed set of applications, the machine learning algorithm may predict similarity for a new set of applications processed by the machine learning algorithm. In other embodiments, similarity is determined by the similar results server based on co-sine distance between the feature vectors.

The similar results server 210 may include an extraction component 211 and similarity engine 212. The extraction component 211 may execute the application in several operating environments to determine the features available to the application and the screen rendered during application processing. The extraction component 211 processes the GUIs to extract GUI Elements, Button text, menu text, URLs or URIs, URL or URI text. The extraction component 211 creates a feature vector based on the extracted information. For instance, the feature vector may include number of screens, hierarchy of screens, battery consumption, foreground time for each screen, number peripherals used (camera, microphone, communication interfaces, screen, printers, etc.), number of languages, number of URLS accessed, or number of URLs displayed. The extraction component 211 may communicate with a taxonomy to classify the extracted GUI elements as language, image, text, video, audio, peripheral, etc.

In other embodiments, the extraction component 211 may populate the feature vectors based on information provided by the publishers during the review period before the application is allowed in the app store. In other embodiments, the application is downloaded and executed to extract features that are rendered to the user. A screen scraper may be used to extract the GUI features for storage in the application database as part of the feature vector. As explained above, the feature vector (app vector 233) may also include the co-purchase data, the textual descriptions, installation history, and browser history. The feature vector is populated from the application in the app store 231. In some embodiments, the rankings in app ratings forum may be included in app vector 233. In other embodiments, a match is determined by checking the values for each attribute in the vectors to determine similarity. The match may include having matches for all attributes or having matches for a defined combination of important attributes.

The similarity engine 212 may determine the similarity between applications, in most embodiments. The similarity engine receives the vectors created by the extraction component 211. The vectors may include binary attributes and weighted features (numeric values). In one embodiment, the cosine distance is employed to measure similarity between vectors $\vec{A}$ and $\vec{B}$. The similarity may be calculated by $$\frac{\sum_{i=1}^{n} A_i \times B_i}{\sqrt{\sum_{i=1}^{n} (A_i)^2} \times \sqrt{\sum_{i=1}^{n} (B_i)^2}}.$$

The closer the values are to 1 the more similar the vectors are. The closer the values are to 0 the more dissimilar the vectors are. The similarity scores and the vectors may be stored in the application database 230.

The client devices 220 may request similar applications from the similar results server. Alternatively, the similar results may be pushed to the clients based on recent accesses, recent installs, or recent browsing activity. In some embodiments, the client devices 220 are thin clients that execute application from the cloud services of a data center. The client devices 220 may have several communication interfaces or media interfaces. In some embodiments, the client devices 220 include installed apps 221, web browser 222, and app client 223. The app client 223 may execute the installed apps 223. The web browser 222 or app client 223 may access the app store 231 for new applications or updates to the installed applications 221. The client devices 220 may render GUIs for the application on a display element. The similar results request or app request 244 may be transmitted to similar results server 210. In turn, the similar results server 210 transmits suggestions 245 to the client device for display.

The suggestions 245 may be filtered by similar results server 210 or client device 220 to reduce the number of suggestions 245 offered for display on the client device 220. The install or browse history may be accessed from the application database 230 to rank the suggestions 245. The suggestions 245 may be prioritized based on the number of installations. The apps with large install numbers are suggested first. Alternatively, the apps with low install numbers may be suggested first.

In still another embodiment, the suggestions 245 are filtered based on application access log. The suggestions 245 may be prioritized based on the frequency of access for the apps. The apps with large access numbers are suggested first. Alternatively, the apps with low access numbers may be suggested first.

In yet another instance, the suggestions 245 are filtered based on application ratings from the rating forum 232. These rating forums may include rankings from app-centric blogs, articles, opinion posts, or other reputable sources. The ratings may be employed to effectively dismiss from consideration those apps initially determined irrelevant. The suggestions 245 may be prioritized based on the ratings. The apps with large ratings are suggested first. Alternatively, the apps with low ratings may be suggested first.

The suggestions 245 are rendered for display on the client device 220. The client devices 220 may include an input device (not shown) and a display element. Generally, the input device is provided to receive input(s) affecting, among other things, the app request 244, a browser 222, as well as any similar applications surfaced in response to the installed applications or the application request. Illustrative devices include a mouse, joystick, key pad, microphone, NUI, I/O components, or any other component capable of receiving a user input and communicating an indication of that input to the client device 220.

In embodiments, the display element is configured to render the suggestions 245. The display element is operably coupled to an output of the client device 220. The display element may be a digital monitor, electronic display panel, touch-screen, analog set top box, plasma screen, audio speakers, Braille pad, and the like. In one exemplary embodiment, the display element is configured to present rich content, such as the browser 222 or installed apps 221. In another exemplary embodiment, the display element renders media (e.g., audio signals).

The application database 230 is accessed by the similar results server 210 to execute the applications and to store the app vectors 233 that are created by the similar results server. In some embodiments, the app vectors are versioned to track changes to the apps in the applications made by the developers. The application database 230 includes an app store 231, app ratings forum 232, app vectors 233, and install/browse history for the apps in the app store. The similar results server 210 may assess similarity based on the app vectors stored in the application database 230.

The app store 231 provides a listing of all apps available to the client device 220. The similar results server 210 may execute the apps in the app store 231 to generate the app vectors 233. The app store 231 may be a marketplace where the client device purchases, licenses, or installs applications.

In an embodiment, the application database 230 is generally configured to store information associated with data generated from current or previous browse/license/install sessions. In various embodiments, such information may include, without limitation, recorded browsing/install behavior of society in general, a log of a particular user's tracked interactions with cloud applications, and other information that pertains to embodiments of the invention. In addition, the application database 230 may be configured to be searchable for suitable access of the stored information including apps available in the app store 231. It will be understood and appreciated by those of ordinary skill in the art that the information stored in the application database 230 may be configurable and may include any information relevant to identifying relevant applications based on browsing activity. The content and volume of such information are not intended to limit the scope of embodiments of the invention in any way. Further, though illustrated as single, independent components, the application database 230 may, in fact, be a plurality of databases, for instance, a database cluster, portions of which may reside on the client device 220, the server 210, another external computing device (not shown), and/or any combination thereof.

The network 240 connects the similar results server 210, client device 220, and application database 230. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

Technology, introduced by embodiments of the invention, for surfacing similar applications is described above with reference to FIG. 2. In particular, FIG. 2 depicts an exemplary system architecture 200 of a distributed computing environment, suitable for use in implementing embodiments of the invention. It should be understood and appreciated that the exemplary system architecture 200 shown in FIG. 2 is merely an example of one suitable computing environment and is not intended to suggest any limitation as to the scope of use or functionality of the embodiments of the invention. Neither should the exemplary system architecture 200 be interpreted as having any dependency or requirement related to any single component or combination of components illustrated therein.

The applications available at the app store may be compared based on feature vectors. The comparison may assess the graphical elements of the user interfaces made available during execution on the application. The comparison may also include comparison of descriptions or co-purchase data available for the application.

Figure 3:
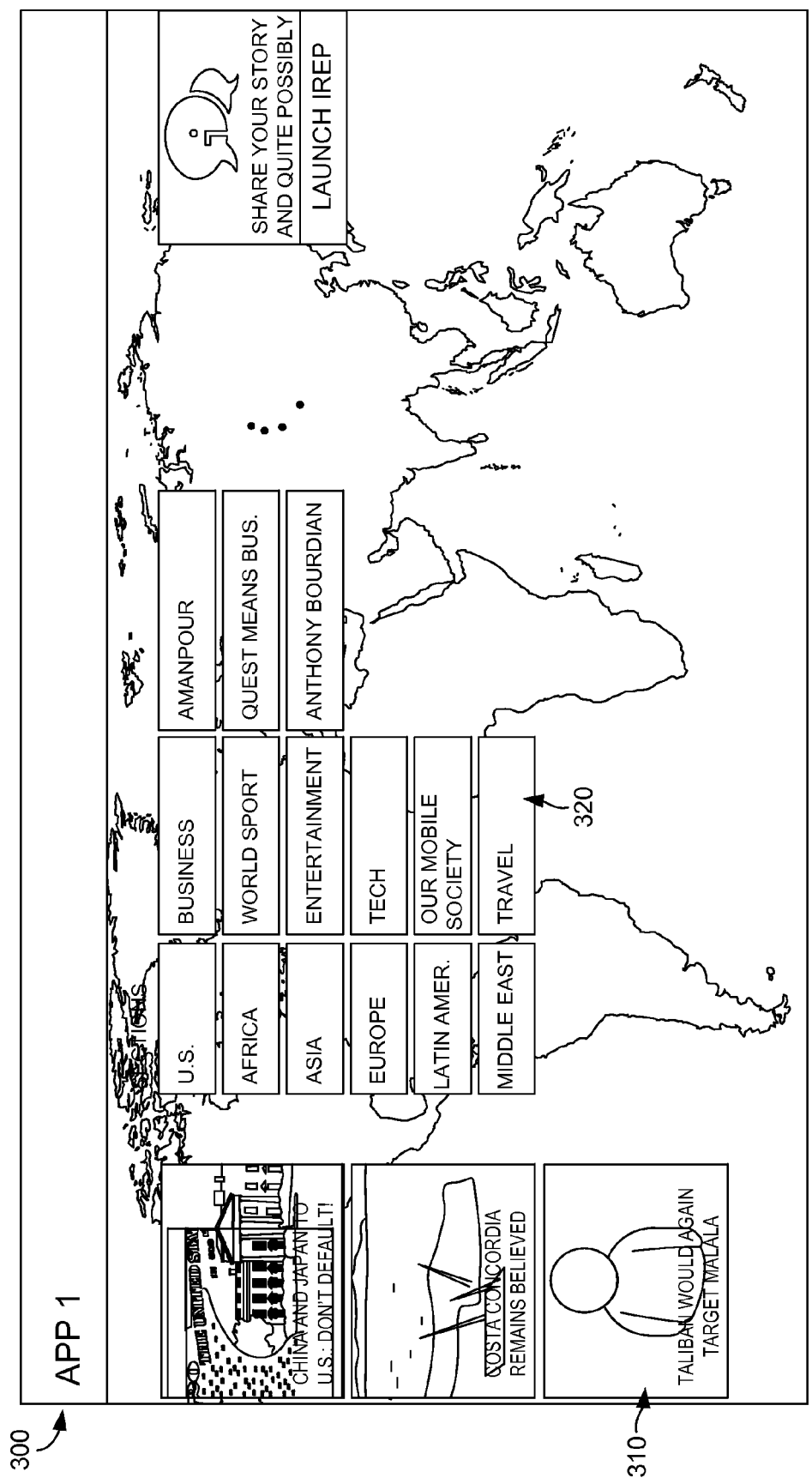
FIG. 3 is a screenshot of an exemplary user interface of a first application in accordance with embodiments of the invention.

FIG. 3 is a screenshot of an exemplary user interface of a first application 300 in accordance with embodiments of the invention. The first application includes a graphic element for various links 320 (e.g., "U.S.," "Travel," "Business," "Europe" and other links or graphic elements for articles 310 that are extracted from the executed application). The similar results server may populate an application vector for this application 300.

| APP 300 | | |
|---|---|---|
| Signal Type | Signal Name | Example |
| Static Text Content | | |
| | Button Text | 'Entertainment' |
| | Menu Text | 'Share your story' |
| | Free Text (weighted by font size) | 'APP 1' |
| | Text on any GUI element | 'China and Japan' |
| | Map Text to Locations | 'China' in China on Map App |
| | Language | 'English' |
| Dynamic Text Content | | |
| | Text Surrounding Images | 'Costa Concordia' |
| | Link URL | 'msn.app1.com' |
| | Link Title | '. . . US Debt Default. . .' in Finance App |
| | Link Text | '...Costa Concordia' |
| | Stats on Content Type | '95% Text Content' 5% Video Content |

| APP 300 | | |
|---|---|---|
| Signal Type | Signal Name | Example |
| Static Look and Feel | | |
| | Input Elements Sliding/Non-Sliding Form Names, Form Fields Names | "Text Box", "Dropdown" "sliding" "scrollable" Travel App |
| | Number of screens | 1 top level, 12 2nd level in fox news app vs. a game with 200 levels |
| | Structure of screens | "click" structured news app |
| Dynamic Usage | | |
| | UI events | Buttons/menus/etc. used |
| | Battery Consumption | Not Available |
| | Memory and CPU consumption | Not Available |
| | Wi-Fi/Network Usage | Not Available |
| | 3G Usage | Not Available |
| | Foreground/ Background Time | Foreground Only |
| | Number of daily launches | 30 |
| Dynamic Image Image Content | Text via OCR | Costa Concordia |
| | Semantic Image Content Via classifier | Island Cruise |
| Complex Content | | |
| | Ad Text | Travel to Italy |
| | Social media functions | "post to facebook" |
| | Camera/ Recording function | "take photo" |
| | Sound Output | Sounds in Media Playback |
| App Meta Data | | |
| | I/O peripherals | 'camera and mic' |
| | Template | "scroller template" News, Travel, Finance etc. . . . |

Figure 4:
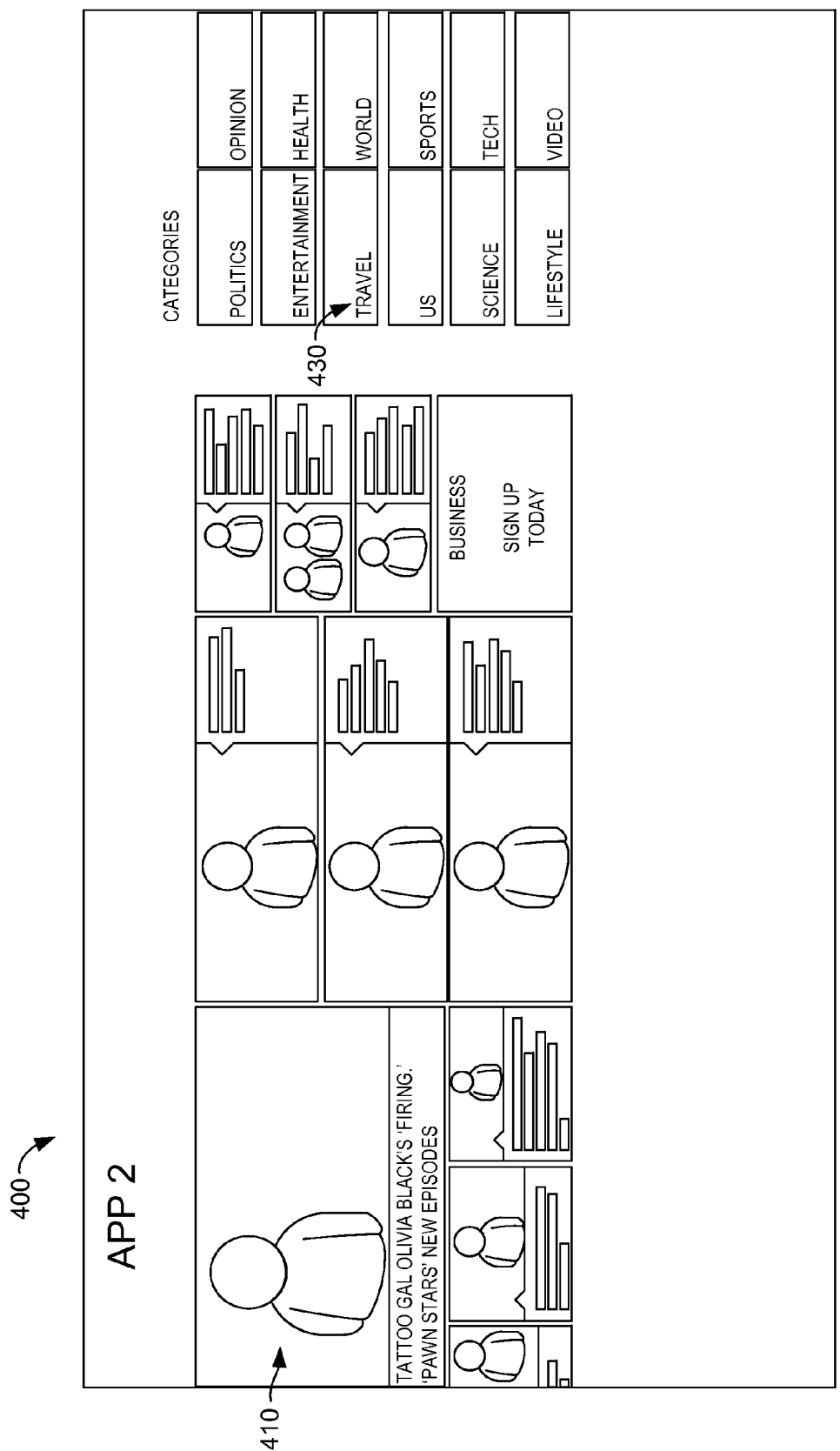
FIG. 4 is a screenshot of an exemplary user interface of a second application in accordance with embodiments of the invention.

FIG. 4 is a screenshot of an exemplary user interface of a second application 400 in accordance with embodiments of the invention. The second application includes a graphic element for various links 420 (e.g., "U.S.," "Travel," "Business," "Science" and other links or graphic elements for articles 410 that are extracted from the executed application 400. The similar results server may populate an application vector for this application 400.

| APP 400 | | |
|---|---|---|
| Signal Type | Signal Name | Example |
| Static Text Content | | |
| | Button Text | 'Travel' |
| | Menu Text | 'Sign Up' |
| | Free Text (weighted by font size) | 'APP 2' |
| | Text on any GUI element | 'World' |
| | Map Text to Locations | World on Map App |
| | Language | 'English' |
| Dynamic Text Content | | |
| | Text Surrounding Images | 'Business' |
| | Link URL | 'msn.app2.com' |
| | Link Title | '. . . Stars. . .' in Entertainment App |
| | Link Text | '. . .New Episode' |
| | Stats on Content Type | '95% Video Content' 5 % Text Content |
| Static Look and Feel | | |
| | Input Elements Sliding/Non-Sliding Form Names, Form Fields Names | "Text Box", "Dropdown" "sliding" "scrollable" Politics App |
| | Number of screens | 1 top level, 12 2nd level in fox news app vs. a game with 200 levels |
| | Structure of screens | "click" structured news app |
| Dynamic Usage | | |
| | UI events | Buttons/menus/etc. used |
| | Battery Consumption | Not Available |
| | Memory and CPU consumption | Not Available |
| | Wi-Fi/Network Usage | Not Available |
| | 3G Usage | Not Available |
| | Foreground/ Background Time | Foreground Only |
| | Number of daily launches | 40 |
| Dynamic Image Content | Image Text via OCR | Business |
| | Semantic Image Content Via classifier | Person or Professional |
| Complex Content | | |
| | Ad Text | Movies |
| | Social media functions | "post to facebook" |
| | Camera/Recording function | "take photo" |
| | Sound Output | Sounds in Media Playback |
| App Meta Data | | |
| | I/O peripherals | 'camera and mic' |
| | Template | "scroller template" News, Travel, Finance etc. . . . |

The similar results server compares the app vectors for the GUIs of the two applications 300 and 400 and determines that these applications are similar. The similarity may be evaluated from the values available from the executed applications. The application vectors of application 300 and 400 may include the binary or weighted features shown above in the exemplary app vectors.

The similar results server may execute a computerized method to assess similarity between the applications. The server extracts graphic elements for application GUIs. In turn, a feature vector for reach application is populated. These vectors may be the basis for calculating distance between vectors as a measure of similarity.

Figure 5:
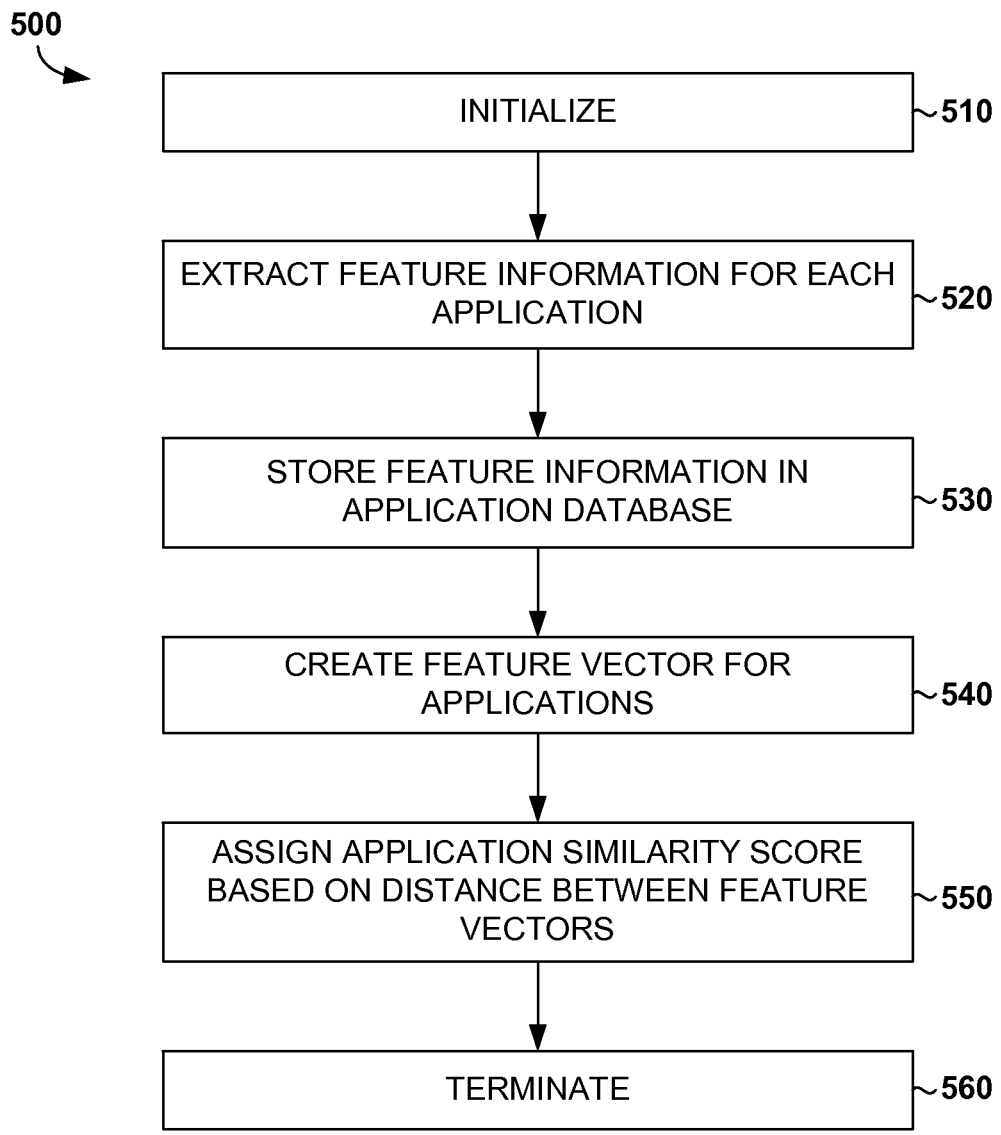
FIG. 5 is a logic diagram of a computerized method for identifying similar applications according to embodiments of the invention.

FIG. 5 is a logic diagram 500 of a computerized method for identifying similar applications according to embodiments of the invention. The method initializes in step 510. In step 520, the similar results server extracts feature information from applications. In one embodiment, the feature information is provided by publishers of the applications. This feature information is provided during a review period before the application enters an application store. In other embodiments, the feature information is parsed by a screen reader. Normally, the feature information includes binary information and weighted information.

The binary information may include access to a video interface, existence of button graphics, existence of menu graphics, existence of input elements, existence of links, access to microphone, access to network interfaces, access to other applications, existence of battery consumption indicator, or existence of description text.

The weighted information may include number of accesses to a video interface, number of button graphics, number of menu graphics, number of screens, number of input elements, number of links, number of accesses to microphone, number of accesses to network interfaces, number of accesses to other applications, percent content formatted in each media type, number of languages, number of daily launches, application version, number of levels, or number of co-purchased applications. The weighed information may also include the number of actual usage of GUI elements. For example, a count the number of buttons with the word "share" and how often these GUI elements are actually used is extracted for the application behavior. In one app the "share" button may exist 5 times but be of negligible use (used less than 5 times). In another app, the "share" button may exist "2" times but be of central use (used 100s of times).

In turn, the feature information is stored in an application database, in step 530. In some embodiments, the applications are stored in an application store that is part of the application database. The applications may include game applications or productivity applications.

The similar results server creates feature vectors for each application, in step 540. And the similar results server assigns, in step 550, similarity scores to each application based on the distance between feature vectors. Optionally, the similar results server may return suggestions that include results having a query application and one or more applications that are close in similarity score to the query application. The method terminates in step 560.

Accordingly, embodiments of the invention provide a similar results server that provides application suggestions. Each application is processed to create feature vectors that include binary and weighted attributes from graphical user interfaces of the executed applications. The full app representation may be a concatenation of all (or some of) these feature vectors. A similarity computation is performed using the feature vectors. For instance, the feature vectors compare static elements such as buttons for similarity in text, color, structure, and link depth. The similar results engine may calculate the distance between vectors and return apps having vectors that are close to each other.

Although applications (or apps) are growing in popularity, many general users of web browsers may be unaware of the type and number of applications that are available. Additionally, even if a user has purchased an application, the user may have forgotten about the purchase and/or the user may be unaware of the value of the application for solving a particular problem. To increase the utility and/or availability of applications to a user, a user's browsing activity can be used to identify applications for presentation. This presentation or surfacing of applications can be done without waiting for a search query from the user. Instead, the user's browsing, access, or install activity can be monitored, and potentially relevant applications can be displayed for selection in a convenient manner.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Various embodiments of the invention have been described to be illustrative rather than restrictive. Alternative embodiments will become apparent from time to time without departing from the scope of embodiments of the inventions. It will be understood that certain features and sub-combinations are of utility and may be employed without reference to other features and subcombinations. This is contemplated by and is within the scope of the claims.

The technology claimed is:

1. A computer-implemented method for detecting similar applications, the method comprising:
    executing applications in at least one operating environment to determine features available to the applications rendered during application processing;
    extracting feature information from graphical user interface (GUI) elements of the applications, the GUI elements being rendered by the applications during execution of the applications;
    storing the feature information in an application database;
    creating feature vectors for each application, the feature vectors being based on the extracted feature information from the GUI elements;
    assigning similarity scores to each application based on a distance between feature vectors, each similarity score of the similarity scores indicating a similarity of the GUI elements; and
    returning suggestions that include results for a query application and one or more applications that are close in similarity score to the query application.

2. The method of claim 1, wherein the feature information is provided by publishers of the applications.

3. The method of claim 2, wherein the feature information is provided during a review period before the application enters an application store.

4. The method of claim 1, wherein the feature information is parsed by a screen reader.

5. The method of claim 1, wherein the feature information comprises binary information and weighted information.

6. The method of claim 5, wherein the binary information includes access to a video interface; existence of button graphics, existence of menu graphics, existence of input elements, existence of links, access to microphone, access to network interfaces, access to other applications; existence of battery consumption indicator, or existence of description text.

7. The method of claim 5, wherein the weighted information includes number of accesses to a video interface, number of button graphics, number of menu graphics, number of screens, number of input elements, number of links, number of accesses to microphone, number of accesses to network interfaces, number of accesses to other applications, percent content formatted in each media type, number of languages, number of daily launches, application version, number of levels, or number of co-purchased applications.

8. The method of claim 1, wherein the applications are stored in an applications store.

9. The method of claim 1, wherein the applications include game applications or productivity applications.

10. One or more computer systems for recommending similar applications, the systems comprising:
- a database to store feature information from graphical user interface (GUI) elements of applications; and
- a similar results server to provide one or more similar applications that are close in similarity score to a query application identified by a user, the similar results server including:
- an extraction engine to:
- execute applications in a plurality of operating environments to determine features available to the one or more similar applications rendered during application processing;
- extract the feature information from the GUI elements of the one or more similar applications,
- the GUI elements being rendered by the one or more similar applications during execution of the one or more similar applications; and
- create feature vectors for each application, the feature vectors being based on the extracted feature information from the GUI elements; and
- a similarity engine to assign similarity scores to each application based on a distance between feature vectors, each similarity score of the similarity scores indicating a similarity of the GUI elements.

11. The systems of claim 10, wherein the applications are part of an application store.

12. The systems of claim 10, wherein the applications include game applications.

13. The systems of claim 10, wherein the applications include news applications.

14. The systems of claim 10, wherein the extraction engine stores the identified features in feature vectors that are stored in the database.

15. The systems of claim 10, wherein the query application is identified by the user or the query application is identified by a recent installation on a device accessed by the user.

16. The systems of claim 10, wherein the similarity scores are based on similarity between feature vectors based on the identified features.

17. One or more computer-readable media having embodied thereon computer-executable instructions that, when executed, detect similar applications, comprising:
- executing applications in a plurality of operating environments to determine features available to the applications rendered during application processing;
- extracting feature information from graphical user interface (GUI) control elements of the applications, the GUI control elements being static elements and rendered by the applications during execution of the applications;
- storing the feature information in an application database;
- creating feature vectors for each application, the feature vectors being based on the extracted feature information from the GUI control elements; and
- assigning similarity scores to each application based on a distance between feature vectors, each similarity score of the similarity scores indicating a similarity of the GUI control elements; and
- returning suggestions that include results for a query application and one or more applications that are close in similarity score to the query application.

18. The media of claim 17, wherein the feature information is parsed by a screen reader.

19. The media of claim 17, wherein the feature information includes access to a video interface; existence of button graphic, existence of menu graphics; existence of input elements, existence of links, access to microphone, access to network interfaces, access to other applications; battery consumption indicator, existence of description text; number of accesses to a video interface; number of button graphics, number of menu graphics; number of screens, number of input elements, number of links, number of accesses to microphone, number of accesses to network interfaces, number of accesses to other applications; percent content formatted in each media type, number of languages, number of daily launches, application version, number of levels, or number of co-purchased applications.

20. The media of claim 17, wherein at least one of the GUI control elements is a button.

* * * * *